United States Patent
Zohar et al.

(10) Patent No.: US 9,462,077 B2
(45) Date of Patent: Oct. 4, 2016

(54) SYSTEM, METHOD, AND CIRCUIT FOR SERVICING A CLIENT DATA SERVICE REQUEST

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 858 days.

(21) Appl. No.: 11/070,752

(22) Filed: Mar. 2, 2005

(65) Prior Publication Data

US 2006/0200456 A1 Sep. 7, 2006

(51) Int. Cl.
*H04L 29/08* (2006.01)
*G06F 21/60* (2013.01)
*G06F 17/30* (2006.01)
*G06F 9/48* (2006.01)

(52) U.S. Cl.
CPC ........... *H04L 67/322* (2013.01); *G06F 9/4881* (2013.01); *G06F 17/30864* (2013.01); *G06F 21/604* (2013.01)

(58) Field of Classification Search
CPC .......... G06F 17/30864; G06F 21/604; G06F 9/4881
USPC ...................................... 707/4, 705
See application file for complete search history.

(56) References Cited

U.S. PATENT DOCUMENTS

| | | | | |
|---|---|---|---|---|
| 5,506,966 | A * | 4/1996 | Ban ............................. | 719/314 |
| 6,058,389 | A * | 5/2000 | Chandra et al. .................. | 707/1 |
| 2002/0019879 | A1* | 2/2002 | Jasen et al. .................. | 709/240 |
| 2002/0056006 | A1* | 5/2002 | Vange et al. .................. | 709/235 |
| 2003/0046396 | A1* | 3/2003 | Richter et al. ................ | 709/226 |
| 2003/0097443 | A1* | 5/2003 | Gillett et al. ................. | 709/225 |
| 2003/0101213 | A1* | 5/2003 | Wright .................... | H04L 29/06 |
| | | | | 709/203 |

* cited by examiner

*Primary Examiner* — Dinku Gebresenbet
(74) *Attorney, Agent, or Firm* — Griffiths & Seaton PLLC

(57) ABSTRACT

One or more parameters of a received data service request may be compared against a lookup table. Based on one or more priority values stored in the lookup table and associated with the one or more request parameters, the data service request may be assigned a priority level.

31 Claims, 4 Drawing Sheets

SYSTEM, METHOD, AND CIRCUIT FOR SERVICING A CLIENT DATA SERVICE REQUEST

FIELD OF THE INVENTION

The present invention generally relates to the field of communication and storage. More particularly, the present invention relates to a system, method and circuit for responding to client data service (e.g. data retrieval and/or storage) requests.

BACKGROUND OF THE INVENTION

In distributed data systems it is known to use data storage servers to store data associated with a plurality of clients. The client/server model enables the clients and the servers to exchange data, and thus provides a convenient way to interconnect hardware and software that are distributed efficiently across different devices and different locations.

Typically, while the server has sufficient available resources to process and service an incoming request(s), the server will proceed without delay to service such incoming transactions. However, when the server is already operating at full or near full capacity, the server may not be able to commence service immediately upon receiving the additional transaction(s). In this case, the server may temporarily store one or more pending transaction(s) in a buffer (typically a substantially temporary storage medium). When more than one transaction is forwarded to the buffer, the server may create a queue of pending transactions. The pending transactions queue usually includes all the pending transactions which are waiting to be serviced. In the queue, the pending transactions are commonly sorted by their time of arrival into the buffer or into the server.

The server-managed pending transactions queue commonly does not take into account considerations relating to the client's needs. Consequently, transactions which may be regarded under certain circumstances by the client as "high priority" transactions may linger within the buffer, while "low priority" transactions are being serviced, and vice-versa.

Thus, there is a need for a system, a method and a circuit for managing a pending transaction queue in a data server. There is a further need to provide a system, a method and a circuit implementing a QoS (Quality of Service) policy for managing a pending transaction queue in a data server. There is yet a further need to provide a system, a method and a circuit for prioritizing transactions within a pending transaction queue in a data server in accordance with one or more priority level requests generated by the clients.

SUMMARY OF THE INVENTION

Some embodiments of the present invention may relate to a system, a circuit and a method of establishing a data request priority level. In accordance with some embodiments of the present invention, one or more parameters of a received data service request may be compared against a lookup table. Based on one or more priority values stored in the lookup table and associated with the one or more request parameters, the data service request may be assigned a priority level.

In accordance with some embodiments of the present invention, the one or more parameters of the received requests may be correlated with a client who issued the service request. In accordance with further embodiments of the present invention, the one or more parameters of the received request may be associated with a priority request level requested by the client.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
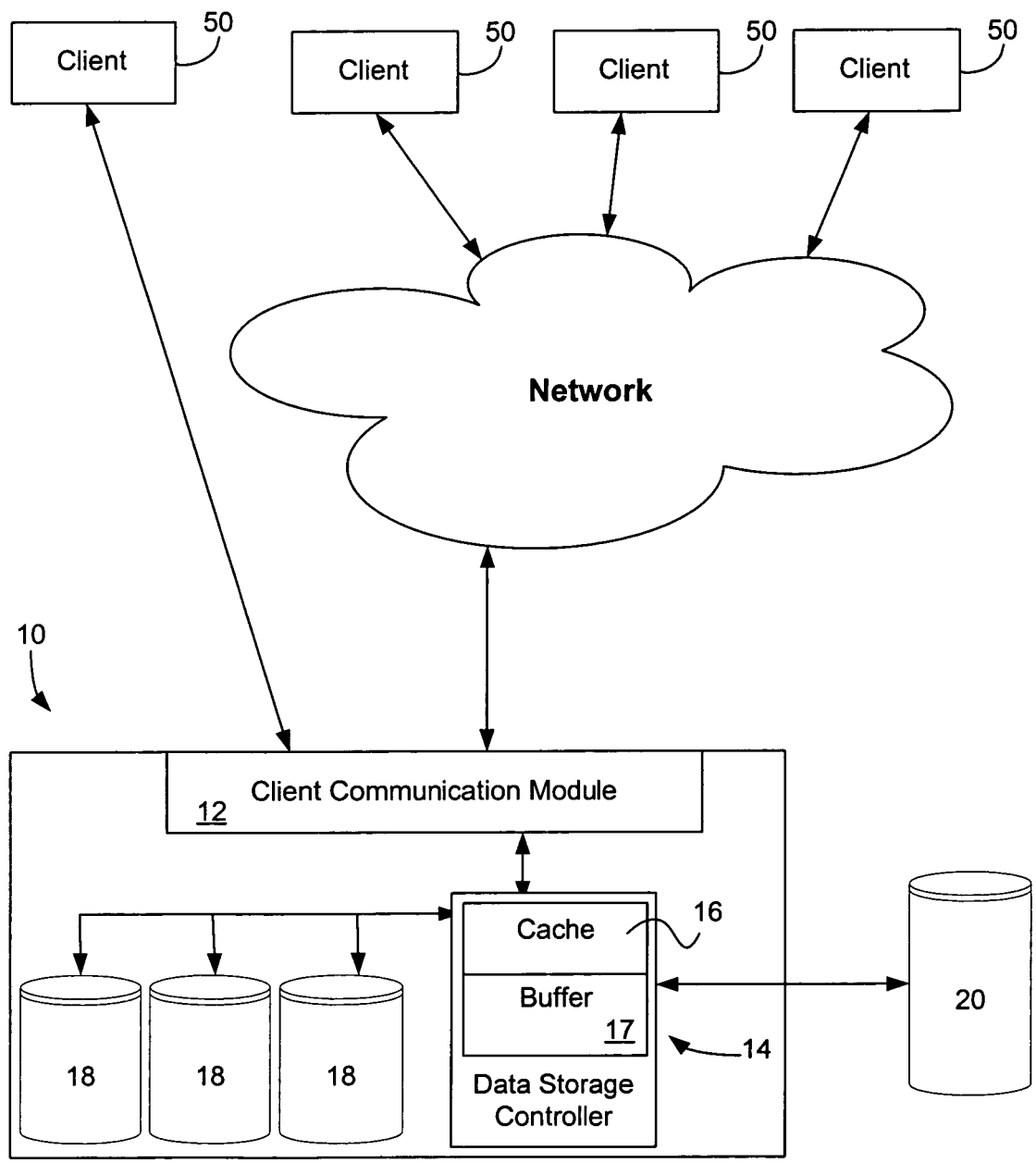
FIG. 1A is a block diagram illustration of a system for managing a pending transaction queue, as part of some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 1B:
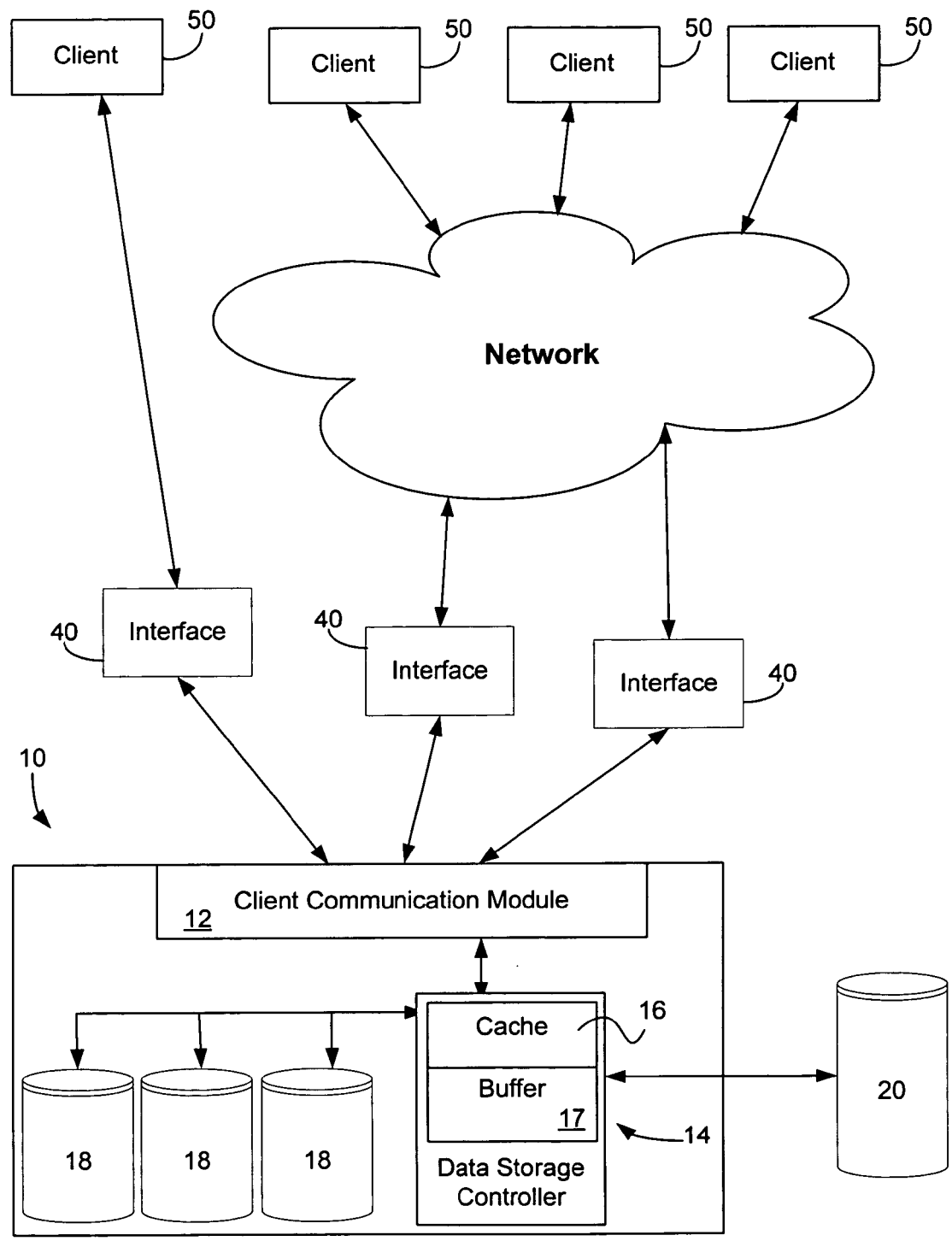
FIG. 1B is a block diagram illustration of a system for managing a pending transaction queue, as part of some embodiments of the present invention.

Reference is now made to FIG. 1, which is a block diagram illustration of a system for managing a pending transaction queue, as part of some embodiments of the present invention. As part of some embodiments of the present invention, one or more clients 50 may be associated with a server storage system 10. Each of the clients 50 may be connected to the server 10 either directly or through a network.

In accordance with some embodiments of the present invention, the server 10 may include a client communication module 12, for example, an IP stack. The client communication module 12 may be adapted to receive and/or transmit data from or to one or more of the clients 50 associated with the server 10. For example, in accordance with some embodiments of the present invention, the client communication module 12 may be adapted to receive I/O requests arriving from the clients 50. The client communication module 12 may also be adapted to transmit data to one or more of the clients 50.

In accordance with some embodiments of the present invention, when a request is received at the server 10, the client communication module 12 may be configured to read one or more metadata segments associated with or attached to the incoming request, and may extract predefined data to be used by the client communication module 12 and/or other elements associated with the server 10. In accordance with further embodiments of the present invention, when data is transmitted from the server 10 to the client(s) 50, the data to be transmitted may be forwarded to the client communication module 12, and the client communication module 12 may attach or may associate the outgoing data with metadata. Client communication modules are well-known in the art. Any presently known or yet to be devised in the future suitable client communication module may be used as part of some embodiments of the present invention.

In accordance with some embodiments of the present invention, the server 10 may further include a controller 14. The controller 14 may be adapted to manage the operation of one or more of the elements associated with the server 10. In accordance with some embodiments of the present invention, the server 10 may be further adapted to monitor and/or to examine and/or to analyze the operation of the elements associated with the server 10. Some of the functions of the controller 14 will be discussed with greater detail hereinbelow.

In accordance with some embodiments of the present invention, the controller 14 may include a cache storage device 16. In accordance with some embodiments of the present invention, the cache storage device 16 may be used to substantially temporarily store data. For example, upon receiving an incoming request, the client communication module 12 may forward the incoming request to the controller 14, and the controller 14 may store the incoming request in the cache 16.

In accordance with some embodiments of the present invention, the server 10 may also include or be associated with one or more disk devices 18. Each of the disk devices 18 may be adapted to substantially permanently store data within the server 10, including but not limited to data arriving from the clients 50. For example, in accordance with some embodiments of the present invention, the controller 14 may forward at least some of the incoming requests arriving from the clients 50 to the disk devices 18 (possibly after being stored for a short while within the cache 16) where the requests or where data associated with the requests may be substantially permanently stored.

In accordance with some embodiments of the present invention, the server 10 may further include a buffer 17. For example, in accordance with the embodiment illustrated in FIG. 1, the buffer 17 may be implemented as part of the controller 14. Here, the buffer 17 is shown to use the storage resources of the cache storage device 16. However, it should be noted that this implementation of the buffer 17 is exemplary in nature and any other suitable implementation may be used to implement the buffer 17, for example, the buffer may be implemented in one or more of the disk storage devices 18 associated with the server 10. In another example, in accordance with some embodiments of the present invention, the buffer 17 may be a discrete storage element functionally connected to the controller 14.

In accordance with some embodiments of the present invention, when the server 10 is unable to substantially immediately service an incoming request, for example, when the server 10 is engaged in performing other tasks (e.g., servicing previously received requests, etc.) which require the use of a substantial portion of the server's 10 resources, the controller 14 may be configured to forward the incoming request to the buffer 17. The buffer 17 may be used to substantially temporarily store the incoming request. In accordance with some embodiments of the present invention, an incoming request may be kept within the buffer 17 until the server 10 becomes available to service the request. The process of forwarding a request to the buffer 17, including the controller's 14 decision with regards to forwarding a certain incoming request to the buffer 17, and the process of managing the buffer 17 will be discussed in greater detail hereinbelow.

In accordance with some embodiments of the present invention, the controller 14 may be configured to monitor the availability of the server's 10 resources. The controller 14 may monitor the server's 10 resources continuously, routinely (e.g. at predefined and/or or dynamically changing time intervals) or periodically (e.g., whenever certain events associated with the buffer occur) to determine the availability of the server's 10 resources. In accordance with further embodiments of the present the controller 14 may monitor the server's 10 resources only when the buffer 17 and the associated pending transaction queue are empty.

In accordance with some embodiments of the present invention, while the buffer 17 is empty and a new request is received at the server 10, the controller 14 may examine the server's 10 resources to determine whether the server's 10 resources are sufficiently available to service the incoming request. In accordance with an alternative embodiments of the present invention, the controller 14 may not be required to examine the server's 10 resources every time a new request is received, and may rather use pre-existing data relating to the availability of the server's 10 resources which the controller 14 may have obtained substantially shortly prior to the receipt of the new request, for example, during a recent routine examination of the server's 10 resources.

In accordance with some embodiments of the present invention, upon receiving an incoming data service request, if the buffer 17 is empty and it is determined that the server's 10 resources are sufficiently available to service the incoming request, the controller 14 may forward the incoming request for servicing substantially immediately upon receiving the incoming request at the server 10. In accordance with further embodiments of the present invention, if it is however determined that the server's resources are not sufficiently available to substantially immediately service the incoming request, or if there are already one or more previously received pending requests stored in the buffer 17, the controller 14 may forward the incoming request to the buffer 17 for substantially temporary storage.

In accordance with some embodiments of the present invention, the buffer 17 may be associated with a pending transaction queue. In accordance with some embodiments of the present invention, the pending transaction queue may include a list of some or all of the pending requests stored in the buffer 17. In accordance with some embodiments of the present invention, each pending request stored in the buffer 17 may be associated with a pending transaction entry in the pending transaction queue.

In accordance with some embodiments of the present invention, the pending transaction queue may be implemented in any suitable data structure, such as for example, an LUT (Look Up Table), and may be implemented in software and/or hardware and either within the controller 14 itself or within a storage medium associated with the controller 14, such as the cache memory 16 or the auxiliary storage device 20.

In accordance with some embodiments of the present invention, the pending transaction queue may be in communication with the controller 14. In accordance with further embodiments of the present invention, the controller 14, either independently or in cooperation with the buffer 17, may update the pending transaction queue whenever certain events which are associated with the pending requests within the buffer 17 occur. For example, in accordance with one exemplary embodiment of the present invention, in case that the controller 14 decides to forward an incoming request to the buffer 17, the controller 14 may be configured to instruct the pending transaction queue to include an entry associated with the incoming request substantially simultaneously with the buffering of the incoming request. In accordance with another embodiment of the present invention, the controller 14 may be configured to instruct the pending transaction queue to remove a pending transaction entry associated with an incoming request substantially simultaneously with the forwarding of the corresponding request from the buffer 17 to be serviced within the server 10, or in any other case in which the request leaves the buffer 17. As will be described in greater detail hereinbelow, in accordance with some embodiments of the present invention, the controller 14 may also be adapted to determine the position of a newly added entry within the pending transaction queue, and may instruct the pending transaction queue to position the newly added entry accordingly.

In accordance with some embodiments of the present invention, the controller 14 may utilize the pending transaction queue to manage the order by which the pending requests stored in the buffer 17 are to be forwarded for servicing when the server 10 becomes available to service one or more of the pending requests. For example, when the controller 14 determines that the server's 10 resources are sufficiently available to service one or more pending request(s), the controller 14 may be configured to retrieve from the buffer 14 or may be configured to cause some other element associated with the server 10 to retrieve from the buffer 17, the pending request(s) that are associated with the entry (or entries) located at a specific location (for example, at the top) within the pending transactions queue. The pending transactions queue may thus be used as a priority list according to which the pending requests in the buffer 17 leave the buffer 17.

In accordance with some embodiments of the present invention, at least some of the incoming requests may be associated, coupled with, or embedded with one or more priority level requests or with one or more priority level parameters. In accordance with some embodiments of the present invention, the priority level requests may be attached by the clients 50 to at least some of the requests which are to be transmitted to the server 10. In accordance with further embodiments of the present invention, the priority level requests may be embedded within the body of at least some of the requests which are to be transmitted to the server 10. The priority level requests may be embedded in a predefined portion of the request which is specifically assigned for storing data indicating the priority level request or parameter which is associated with the request.

In accordance with some embodiments of the present invention, the priority level that is to be associated with a certain incoming request may be determined at the server 10 and by the server 10 or by one of the elements associated with the server 10. In accordance with some embodiments of the present invention, the priority level may be determined in accordance with one or more criteria, parameters, characteristics or indicators associated with the incoming request, with the client 50 with which the incoming request may be associated and/or with the server's operation, performance or any other parameters. For example, upon receiving an incoming request, the client communication module 12 may detect one or more parameters, characteristics or indicators which are associated with the incoming request or with a client 50 with which the incoming request is associated. In accordance with some embodiments of the present invention, upon determining which priority level is to be associated with a certain incoming request, the controller 14 may be adapted to generate a priority level parameter and may associate the incoming request with the priority level parameter. A more detailed description of one exemplary embodiment of the present invention, where the process of determining the priority level parameter which is to be associated with a certain request is carried out by the client 50 associated with the request is provided hereinbelow with reference to FIG. 3.

Provided below are descriptions of various criteria parameters, characteristics or indicators associated with the incoming request, with the client with which the incoming request may be associated and/or with the server receiving the incoming request which may be used to determine the priority level or priority level parameter to be associated with a one or more incoming requests. It should be noted that the present invention is not limited to any one particular embodiment which will be described herein or to any combination thereof. Rather, in accordance with some embodiments of the present invention any criteria, parameter, characteristic or indicator and the like associated with the incoming request, with the client with which the incoming request may be associated and/or with the server receiving the incoming request and any combination thereof, including but not limited to any such criteria, parameter, characteristic or indicator known in the present or yet to be devised in the future which are or will be utilized in a QOS technique, device or system may be used in accordance with some embodiments of the present invention, to determine the priority level that should be associated with a certain incoming request or with certain incoming requests.

In accordance with an exemplary embodiment of the present invention, upon receiving an incoming request, the client communication module 12, the controller 14 or any other suitable component which may be associated with the server 10 may be adapted determine the network address (IP address for example) of the source client 50. The client communication module 12, for example, may be further adapted to forward the incoming request together with data relating to the network address of the source client 50 to the controller 14. The controller 14 may be adapted to consult, for example, a database lookup table associated with the controller 14 (for example, the database may be stored in a disk device 18 or in a RAM unit associated with the controller 14) to determine which priority level should be assigned to requests arriving from this particular client 50. The controller 14 may then be adapted to assign the appropriate priority level to the incoming request in accordance with the data in the database.

In accordance with another exemplary embodiment of the present invention, upon receiving an incoming request, the client communication module 12, the controller 14 or any other suitable component which may be associated with the server 10 may be adapted determine whether the incoming request is associated with a particular application and/or applications (for example, the application that generated the request). The communication module 12, for example, may forward the incoming request together with data relating to the application with which the incoming application is associated to the controller 14. The controller 14 may be adapted, for example, to consult a database associated with the controller 14 to determine which priority level should be assigned to requests which are associated with the particular application with which the incoming request has been determined to be associated with. The controller 14 may then be adapted to assign the appropriate priority level to the incoming request in accordance with the data in the database.

In accordance with another exemplary embodiment of the present invention, upon receiving an incoming request, the client communication module 12 the controller 14 or any other suitable component which may be associated with the server 10 may determine whether the incoming request is associated with a particular logical unit (LU) or with a particular set of logical units. The client communication module 12 may be adapted to forward the incoming request together with data relating to the logical unit(s) with which the incoming request is associated to the controller 14. Alternatively, the client communication module 12 may be responsible simply for receiving the incoming request, and the data relating to the logical unit with which the incoming request is associated may be obtained by the controller 14, either independently or in cooperation with one or more components of the server 10, such as, for example, the client communication module 12. Once it has been determined with which logical unit a particular incoming request is associated, the controller 14 may be adapted to consult, for example, a database associated with the controller 14 to determine which priority level should be assigned to requests which are associated with the particular logical unit with which the incoming request has been determined to be associated with. The controller 14 may then be adapted to assign the appropriate priority level to the incoming request in accordance with the data in the database.

According to some embodiments of the present invention, the logical unit, storage area or volume may be a primary parameter used in determining a requests priority level. For example, all data service requests for data from a particular logical unit or storage area or volume may be given higher priority than other requests, regardless of which client issued the request. However, if multiple requests from multiple clients are received relating to a specific high priority logical unit, the relative priority levels issued to each of those requests may be in an order corresponding to the relative priority levels associated with each of the clients.

In accordance with another exemplary embodiment of the present invention, upon receiving an incoming request, the client communication module 12 may forward the request to the controller 14. When the controller 14 receives a certain incoming request, the controller 14 may obtain data relating to one or more system performance parameters associated with, for example, the performance of one or more components of or associated with the server 10 and/or the performance of one or more components of or associated with the client 50 with which the request may be associated (for example, the source client, or in another example, the destination client). In accordance with one embodiment of the present invention, the controller 14 may be adapted to consult, for example, a database associated with the controller 14 to determine with which priority level should the incoming request be assigned based upon the performance data associated with this particular (or this particular group of) incoming request(s). The controller 14 may then be adapted to assign the appropriate priority level to the incoming request in accordance with the data in the database.

In accordance with some embodiments of the present invention, the performance of or associated with one or more components of the server 10, and/or the performance of one or more components of or associated with the client 50 with which the request is associated may be checked continuously, routinely (e.g. at predefined and/or or dynamically changing time intervals) or periodically (e.g., whenever certain event or events occur(s)). The data obtained during such performance checkups may be either stored to be used at a later time by any component which requires such information and which is authorized to access the data (for example, the controller 14) or may be provided to such components (such as the controller 14) upon demand. Various performance checkups techniques are well-known in the art. Any suitable performance checkup technique known in the present or yet to be devised in the future may be used as part of some embodiments of the present invention. Notwithstanding the above, more detailed discussions of some exemplary performance checkups whereby the server 10 resources may be analyzed and whereby the client(s) 50 resources may be analyzed shall be provided hereinbelow.

In accordance with another exemplary embodiment of the present invention, the controller 14 or any other element of the server 10 may be preconfigured to assign an incoming request with a predetermined priority request level in accordance with a time value associated with the incoming request or relating to the time of occurrence of one or more events associated with the incoming request. For example, in accordance with some embodiments of the present invention, the controller 14 may be in communication with a timing device, such as, a clock, for example. When an incoming request is received, for example, at the controller 14, the controller may be adapted to check the request's time of arrival into the server 10. The controller 14 may be then be adapted to consult, for example, a database or any other data source associated with the controller 14 to determine what priority level should be assigned to requests arriving at this particular time, time period and/or date. In accordance with further embodiments of the present invention, at predetermined time(s) or time period(s) or interval(s) the controller 14 may be configured to switch to a predefined mode or to one of a set of predefined modes, such that when a incoming request arrives into the controller 14, the controller 14 may be adapted to automatically assign the incoming request with a predetermined priority level that is associated with the incoming request's time of arrival, for example, into the server 10 or into the controller 14.

It should be noted that although the above described embodiments relate to the time of arrival of requests into the controller 14, the present invention is not limited in this respect. Rather, in accordance with further embodiments of the present invention, the time of occurrence of other events associated with the server 10, the incoming request and/or the client 50 associated with the incoming request may also be recorded and may influence the priority level which may be assigned to the incoming request by the controller 14. Examples of such events may include but are not limited to, the time of receipt of the incoming request at the server 10, the time of transmission of the request by the source client, etc. It should be further noted that in some cases the time of occurrence of a certain event which may influence the priority level which may be assigned to an incoming request may be recorded and determined outside the controller 14 by any other suitable component. In such cases, the time record associated with such an event may be embedded within the request (e.g., the request may include a timestamp associated with the time of occurrence of the event), or may be otherwise associated with the incoming request. Furthermore, it should also be noted that any time unit may be used to specify the different time(s), time period(s), time interval(s) or the like.

In accordance with yet another exemplary embodiment of the present invention, upon receiving an incoming request, the client communication module 12 or any other component of the server 10, may be adapted to determine the interface (IF) through which the request was received. Reference is now additionally made to FIG. 1B, which is a block diagram illustration of a system for managing a pending transaction queue, as part of some embodiments of the present invention. As part of some embodiments of the present invention, the server 10 may be associated with one or more interfaces 40 through which at least some of the requests transmitted by one or more of the clients 50 may arrive into the server 10. In accordance with some embodiments of the present invention, the client communication module 12 or any other element associated with the server 10 may be adapted to determine through which interface 40 a certain incoming request arrived into the server 10. The client communication module 12, for example, may be adapted to forward the incoming request together with data relating to the interface 40 through which the incoming request arrived into the server 10 to the controller 14. The controller 14 may be adapted to consult, for example, a database or any other information source associated with the controller 14 (for example, the database may be stored in the disk devices 18 or in a RAM unit associated with the controller 14) to determine which priority level should be assigned to requests arriving through this interface 40. The controller 14 may then be adapted to assign the appropriate priority level to the incoming request in accordance with the data in the database.

In accordance with some embodiments of the present invention, the client 50 may be adapted to attach, embed or otherwise associate an outgoing request with additional data or parameters which may be associated with the priority or priority level request (or parameter) associated with the outgoing request. In accordance with further embodiments of the present invention, the server 10 (e.g. the controller 14) may be adapted to detect and to extract such additional data or parameters. In accordance with yet further embodiments of the present invention, the additional data or parameters may effect the controller's 14 decision with regards to the position in which a pending transaction queue entry associated with the incoming request should be placed. In accordance with some embodiments of the present invention, the additional data or parameters may be associated with an incoming request at the server 10 (e.g., by the controller 14) and may similarly affect the controller's 14 decision with regards to the position in which the pending transaction queue entry associated with the incoming request should be placed.

In accordance with some embodiments of the present invention, the controller 14 may be configured to determine the priority level associated with a certain incoming request only while the server's 10 resources are unavailable or are not sufficiently available to substantially immediately service an incoming request or while there are already one or more previously received pending requests stored in the buffer 17. However, in accordance with some embodiments of the present invention, while the server's 10 resources are available or are sufficiently available to substantially immediately service the incoming request and there are no previously received pending requests stored in the buffer 17, the controller 14 may not be required to determine which priority level is or should be associated with a certain incoming request, and instead, the controller 14 may be configured to substantially immediately forward the request for servicing, regardless of what priority level is associated or should be associated with the incoming request. It should be noted that in this case, the incoming request may first be substantially temporarily stored in the cache 16 or may be preprocessed or otherwise manipulated by the controller 14, for example, and may then, following such provisional activity or preparation, may be forwarded to its functional destination within the server 10, for example, to the disk device(s) 18 for substantially permanent storage.

In accordance with further embodiments of the present invention, substantially simultaneously with the forwarding of the incoming request to the buffer 17 and the addition of an entry associated with the incoming request to the pending transactions queue, the controller 14 may be adapted to determine the location of the entry associated with the incoming request within the pending transaction queue. In accordance with some embodiments of the present invention, the controller 14 may be configured to consider the priority level request or parameter associated with a certain incoming request when determining the position of the pending transaction queue entry which is associated with that incoming request.

Provided below are descriptions of various priority rules which may be implemented by the controller 14 to determine the location of a certain transaction queue entry within the pending transaction queue. The controller 14 may be configured to select a certain priority rule in accordance with the priority level request or parameter associated with the incoming request. It should be noted that the present invention is not limited to any one particular embodiment which will be described herein or to any combination thereof. Rather, in accordance with some embodiments of the present invention any priority rule may be implemented by the controller 14 to determine the location of a certain transaction queue entry within the pending transaction queue. Also, as discussed above, the controller's 14 decision with regards to the position of an entry in the pending transaction queue may be affected by additional data and/or parameters, including but not limited to, parameters associated with system performance, data relating to the available buffer 17 storage space, estimated server 10 workload, etc.

In accordance with one exemplary embodiment of the present invention, the controller 14 may be adapted to position an entry correlated with an incoming request which is associated with a particular priority level request or parameter above any entry which is correlated with an incoming request which is associated with priority levels that are considered "lower", and below any entry which is correlated with an incoming request which is associated with priority level(s) that are considered "equal or higher".

In accordance with another exemplary embodiment of the present invention, the controller 14 may be adapted to position an entry correlated with an incoming request which is associated with a particular priority level request or parameter at a certain portion of the pending transaction queue. For example, the controller 14 may be adapted to position an entry correlated with an incoming request which is associated with a particular priority level request or parameter at the top quarter portion, for example, of the pending transaction queue. In another example, the controller 14 may be adapted to position an entry correlated with an incoming request which is associated with a particular priority level request or parameter at the bottom 5 percentile, for example, of the pending transaction queue.

In accordance with another exemplary embodiment of the present invention, the controller 14 may be adapted to position an entry correlated with an incoming request which is associated with a particular priority level request or parameter at a certain position or at a certain portion (e.g., the top third portion, etc.) of the pending transaction queue for a certain period of time, and in case that the incoming request had not been serviced during the predetermined period of time, the controller 14 may be adapted to reposition (e.g. promote or demote) the transaction queue entry within the pending transaction queue in accordance with any priority rule or to discard the incoming request and the transaction queue entry correlated with the incoming request altogether.

For example, in accordance with one embodiment of the present invention, in case that the controller 14 determines that a certain incoming request is of a particular kind (e.g., the incoming request is part of an audio and/or video stream), or that the incoming request pertains to a certain logical unit, the controller 14 may be adapted to position and maintain the incoming request at the top quarter of the pending transaction queue for a predetermined period of time. In accordance with some embodiments of the present invention, after a certain period of time has passed and the incoming request which is correlated with the pending transaction queue entry has yet to be serviced (and therefore the controller 14 has not deleted the entry from the pending transaction queue), the controller 14 may be adapted to promote the transaction queue entry to the top of the pending transaction queue, for example. The repositioning of the entry associated with the incoming request which has yet to be serviced may also be, in accordance with some embodiments of the present invention, for a predetermined period of time, after which the entry may be repositioned again in case that the incoming request correlated with the pending transaction queue entry has yet to be serviced again. If the incoming request has yet to be serviced again, the controller 14 may, for example, be adapted to discard the incoming request and delete the transaction queue entry associated with the request.

In accordance with another exemplary embodiment of the present invention, the controller 14 may be configured to position a pending transaction queue entry correlated with an incoming request which is associated with a particular priority level request or parameter at a certain position or at a certain portion (e.g., the top third portion, etc.) of the pending transaction queue for a certain period of time, and in case that the incoming request had not been serviced during the predetermined period of time, the controller 14 may be configured to reposition (e.g. promote or demote) the transaction queue entry within the pending transaction queue and may disregard the priority level which was associated with the incoming request correlated with the transaction queue entry and reposition the transaction queue entry accordingly or, in accordance with further embodiments of the present invention, the controller 14 may assign the entry associated with the incoming request with a different priority level.

In accordance with yet another exemplary embodiment of the present invention, the controller 14 may be adapted to position an entry correlated with an incoming request which is associated with a particular priority level request or parameter at the average position of all the transaction queue entries which are associated with a similar priority level.

In accordance with further embodiments of the present invention, the buffer 17 may include one or more priority areas, portions, segments or regions. The controller 14 may be adapted to determine based on the priority level associated with a certain incoming request whether to store the incoming request in a certain priority area, portion, segment or region or to store it in the buffer outside the priority area(s), portion(s), segment(s) or region(s). The controller 14 may be further adapted to select in which one of two or more priority areas a certain incoming request should be stored. In accordance with some embodiments of the present invention, the controller 14 may be adapted to select in which one of two or more priority areas a certain incoming request should be stored. In accordance with further embodiments of the present invention, the controller 14 may be adapted to select in which one of two or more priority areas a certain incoming request should be stored in accordance with the priority level associated with that incoming request.

In accordance with some embodiments of the present invention, the controller 14 may be configured to extract pending incoming requests for servicing (e.g., when the server's resources become sufficiently available to service the pending incoming requests) from the priority area(s) of the buffer 17 before extracting pending incoming requests from other areas of the buffer 17 (e.g., before other buffer priority areas or other buffer areas which are associated with a "lower" priority or with no priority at all) after extracting pending incoming requests from other areas of the buffer 17 (e.g., before other buffer priority areas or other buffer areas which are associated with a "higher" priority or with no priority at all) and/or in a predefined order or sequence.

It should be noted that the priority areas described above may be implemented in the cache memory device, in case that the buffer is implemented in a cache memory device, or in the disk storage device(s), in case that the buffer is implemented in the disk storage device, or in any other suitable storage device associated with the server 10.

Figure 2:
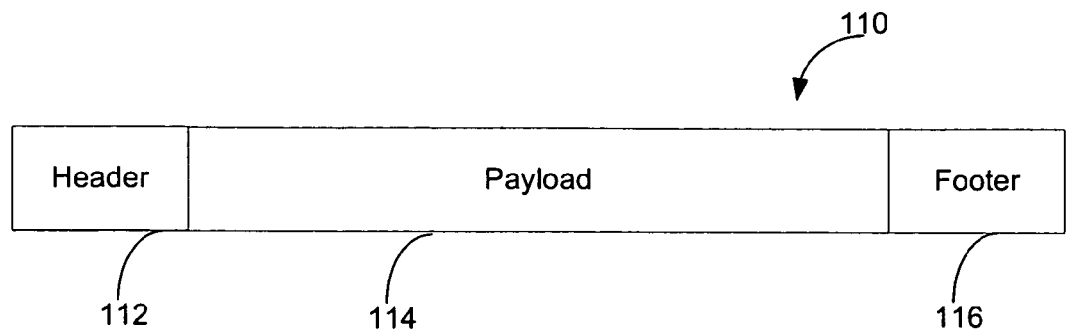
FIG. 2 is a block diagram illustration of an exemplary client/server request, in accordance with an exemplary embodiments of the present invention.

Reference is now made to FIG. 2, which is a block diagram illustration of an exemplary client/server request, in accordance with an exemplary embodiment of the present invention. In accordance with some embodiments of the present invention, the client/server request 110 may include a header portion 112, a footer portion 116 and a payload portion 114. Each of the header and the footer portions 112 and 114 of the request may be used to store metadata, while the payload portion 104 may be used to store the original data which the client is interested in transmitting to the server.

Metadata and the use of metadata in a client/server environment are well known. For example, in accordance with some embodiments of the present invention, the header and/or footer portions 112 and 116 of the request may be used to store a source identifier and a destination identifier. The source identifier may be associated with the source client which transmitted the request, and may be, for example, the network address of the source client. The destination identifier may be associated with the destination server which is intended to receive the request, and may be, for example, the network address of the destination server.

In accordance with further embodiments the header and footer portions 112 and 116 of the request may be used to store additional meta data, including but not limited to timestamps (for example, recording the time or transmission of the request from the source client to the destination server), a serial number associated with the request (for example, the serial number may be used to reconstruct the original order in which the requests were transmitted by the clients at the server where the requests are received).

In accordance with some embodiments of the present invention, the payload portion 114 of the request 110 may include a servicing request. The servicing request may be configured to instruct the server to perform one or more tasks requested by the client. For example, the servicing request may be a write request which when received by the server, may instruct the server to write one or more data segments into a disk device or other storage medium which is associated with the server. In accordance with further embodiments of the present invention, the servicing request may include a payload portion and a metadata portion. In accordance with some embodiments of the present invention, the payload portion may include payload data, such as, for example, but is not limited to, data that is to be written into the server, data relating to data that is to be extracted from the server, etc. In accordance with some embodiments of the present invention, the metadata portion may include, for example, but is not limited to, data relating to which kind of servicing request this request is (e.g., a write request, a read request etc.), the source of the data (e.g., the source client's network address), the requested priority level, etc. In accordance with alternative embodiments of the present invention, the payload may also include data relating to the requested priority level which may be associated with a particular request 110, for example, when the communication protocol does not enable to include data relating to the requested priority level in the metadata portion.

In accordance with some embodiments of the present invention, the priority level request may be associated with a preferred priority level which the client may be requesting to receive from the server. The requested priority level may be specifically associated with a particular request, with the status of the client (e.g. the client's subscriber status), with the availability of the client's resources or with any other request and/or client related considerations.

For example, in accordance with some embodiments of the present invention, the priority level request may be associated with the client's application which is associated with the client's request. For example, in case that an emergency application is requesting critical data which is needed urgently, the priority level request may represent the urgency of the request. In another example, in case that one or more the client's resources are approaching their maximum capacity (for example, the CPU is approaching its maximum processing capacity), the priority level request may represent the "low priority" of the request. In yet another example, in case that the client and the server are associated with a QOS (Quality of Service) agreement which provides the client with certain servicing priorities, the priority level request may indicate to the server that the client is a subscriber and or the subscriber status of the client.

As discussed above, the priority level request may not necessarily be embedded in the client/server request to which it may be related and/or may not necessarily embedded in a specific portion of the client/server request to which it relates. For example, in accordance with some embodiments of the present invention, the priority level request may be embedded within a separate request which may be associated with the request to which the priority level request relates. In this case, the request in which the priority level request is embedded may include some kind of reference to the request to which it is associated. In fact, the server may have information of its own, according to which it knows whom to grant priority of service.

Figure 3:
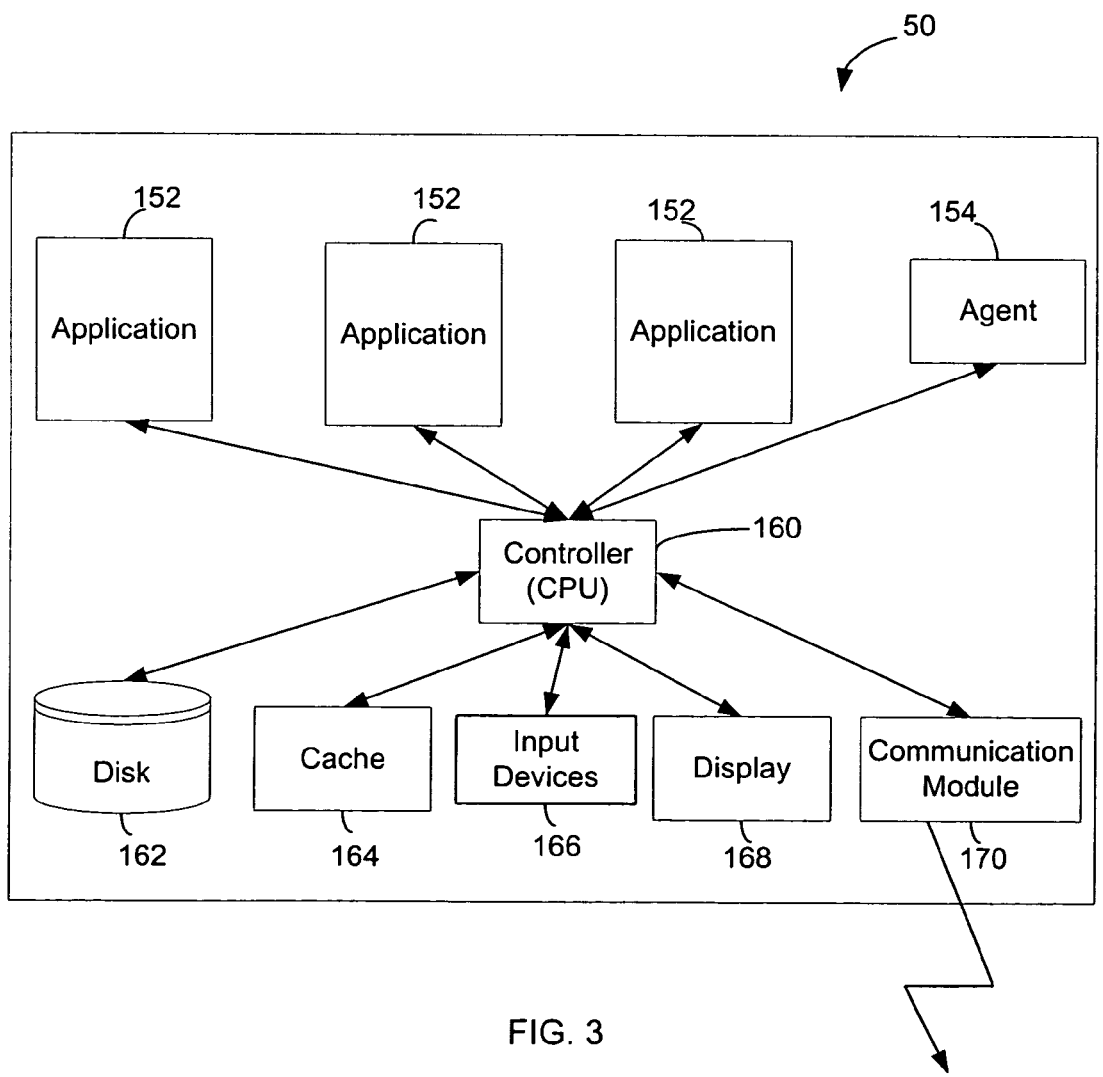
FIG. 3 is a block diagram illustration of a client device, as part of some embodiments of the present invention.

Reference is now made to FIG. 3, which is a block diagram illustration of a client device, as part of some embodiments of the present invention. In accordance with some embodiments of the present invention, the client device 50 may include hardware resources, for example, the client 50 may include a controller 160, one or more disk devices 162, a cache device 164, one or more input devices 166, such as a keyboard, one or more display device 168, a communication module 170 and other devices an elements. It should be noted that the client 50 described above is exemplary in nature and is similar to many Personal Computer devices, however as part of some embodiments of the present invention, other client's implementing other hardware configurations may also be associated with the server and may be adapted to generate client/server requests associated with or embedded with a priority level request, as part of some embodiments of the present invention.

As part of some embodiments of the present invention, the client 50 may be configured to run one or more applications 152. In accordance with some embodiments of the present invention, the client 50 may be installed with and may be configured to run an agent application 154. In accordance with some embodiments of the present invention, the agent application 154 may be configured to monitor the operation of the client device 50. In accordance with some embodiments of the present invention, the agent application may monitor the client's resources and/or performance continuously, routinely (e.g. at predefined and/or or dynamically changing time intervals) or periodically (e.g., whenever certain events associated with the client 50 occur), and the data relating to the client's resources obtained during such check-ups may be used when a new outgoing request is being prepared to be transmitted to the server.

In accordance with further embodiments of the present invention, the agent application 154 may be configured to select a priority level to be associated with a certain outgoing request(s), in accordance with data relating to the operation of the client device 50. In accordance with some embodiments of the present invention, the agent application 154 may be configured to embed a priority level request within a certain outgoing request. In another embodiment of the present invention the agent application 154 may rather associate the outgoing request with a separate request which may include the priority level request associated with the other request.

In accordance with some embodiments of the present invention, the agent application may be configured to monitor the client's hardware resources and/or the client's resources performance. In accordance with further embodiments of the present invention, the agent application 154 may be configured to determine the level of availability of the client's resources and/or the performance level of the client's resources. In accordance with some embodiments of the present invention the agent application 154 may be configured to select different priority levels to be associated with an outgoing request in accordance with the level of availability of the client's resources and/or in accordance with the performance level of the client's resources. In accordance with yet further embodiments of the present invention, the agent application 154 may be configured to select a certain priority level to be associated with an outgoing request when the client's resources or performance are at a certain predefined level, while the agent application 154 may be configured to select a different priority level to be associated with the outgoing request when the client's resources or performance are at a different predefined level.

For example, in accordance with some embodiments of the present invention, the agent application may be configured to select a "low priority" level to be associated with an outgoing request when the client's 154 resources or performance fall below a predetermine threshold, and the agent application may be configured to select a "high priority" level to be associated with an outgoing request when the client's 154 resources or performance are above a predetermine threshold. It should be noted that the above description is exemplary in nature and that the agent application 154 may be configured to select more than to priority level which are to be associated with a certain outgoing request. Furthermore, in accordance with further embodiments of the present invention, the agent application 154 may be configured to consider other factors when selecting the priority level which is to be associated with a certain outgoing request, for example, the agent application may take into consideration the subscriber status which is associated with the client device 50 when selecting the priority level which is to be associated with an outgoing request.

Figure 4:
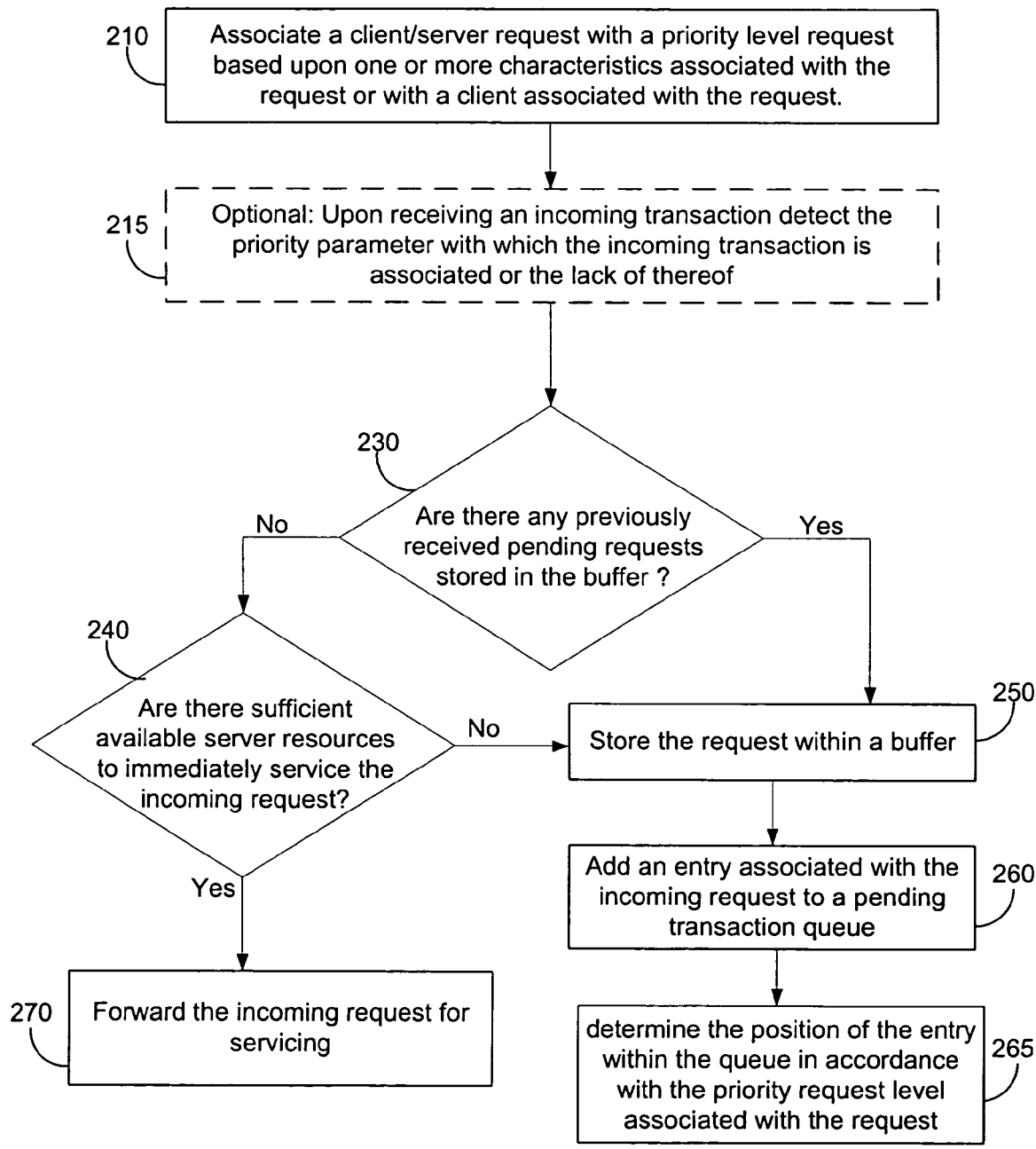
FIG. 4 is a flow chart illustration of a method of managing a pending transaction queue, as part of some embodiments of the present invention.

Reference is now made to FIG. 4, which is a flow chart illustration of a method of managing a pending transaction queue, as part of some embodiments of the present invention. In accordance with some embodiments of the present invention, a client/server request may be associated with a priority level request (or parameter). The priority level request which is to be associated with the client/server request may be selected based upon one or more characteristics associated with the request or with a client associated with the request (block 210).

In accordance with further embodiments of the present invention, the priority level request to be associated with a certain request may be selected and associated with the request at the server (block 215). In accordance with this optional embodiment of the present invention, the server may select which priority level request is to be associated with a certain incoming request, and may associate the priority level request with the incoming request upon the receipt of the request at the server. The priority level request or parameter may be selected by the server based upon one or more characteristics associated with a client associated with the request or based upon one or more characteristics associated with the request. For example, the priority level request to be associated with a certain request may be selected by the server upon receiving the request, based upon the IP address of the client from which the request is received. In another example, the priority level request to be associated with a certain request may be selected by the server upon receiving the request, based upon one or more indicators embedded in or attached to the request.

However, in accordance with an alternative embodiment of the present invention, the priority level request may be selected and associated with the request by the client prior to transmitting the request to the server. In accordance with some embodiments of the present invention, the incoming requests may be associated, coupled with, or embedded with one or more priority level requests (or parameters).

In accordance with some embodiments of the present invention, once a new incoming request is received at the server, the server may check whether there are previously received pending requests already in the server waiting to be serviced (such pending requests may be stored, for example, in a buffer associated with the server) (block 230).

In accordance with some embodiments of the present invention, if it is determined that there are no previously received pending requests already in the server waiting to be serviced, the server (or the server's resources) may be may proceed to check the server's resources to determine whether the server has sufficient resources available to substantially immediately service the incoming request (block 240). In accordance with further embodiments of the present invention, it may not be necessary to check the availability of the server's resources each time a request is received at the server, and rather preexisting data relating to the servers resources may be used. In accordance with some embodiments of the present invention, the server's resources may be continuously, routinely (e.g. at predefined and/or or dynamically changing time intervals) or periodically (e.g., whenever certain events associated with the buffer occur) checked to determine the availability of the server's resources, and the data relating to the server's resource obtained during such check-ups may be used when a new incoming request is received.

In accordance with some embodiments of the present invention, in case it is determined that the there are no previously received pending requests already in the server waiting to be serviced, and that the server's resources are sufficiently available to substantially immediately service the incoming request, the incoming request may be forwarded for servicing within the server (or to elements associated with the server) (block 270). For example, the incoming request may be forwarded to a disk device associated with the server for substantially permanent storage.

In accordance with some embodiments of the present invention, if however it is determined that either there are previously received pending requests already in the server waiting to be serviced, or if it is determined that the server's resources are not sufficiently available to substantially immediately service the incoming request, the incoming request may be forwarded to a buffer (block 250). The incoming request may be substantially temporarily stored within the buffer.

In accordance with some embodiments of the present invention, substantially simultaneously with the forwarding of the incoming request to the buffer, an entry associated with the incoming request may be added to a pending transaction queue associated with the buffer (block 260). The addition of the incoming request to the pending transaction queue was discussed in greater detail hereinabove with reference to FIG. 1.

In accordance with some embodiments of the present invention, substantially simultaneously with the addition of the entry to the pending transaction queue, the position of the entry within the pending transaction queue may be determined (block 265). As described above with reference to FIG. 1, the position of the entry associated with the incoming request may be associated with the priority level request which is associated with the incoming request which is correlated with the entry. In accordance with further embodiments of the present invention, the position of an entry in the pending transaction queue may be also be affected by additional data and/or parameters, including but not limited to, parameters associated with system performance, data relating to the available buffer 17 storage space, estimated server workload, etc.

For example, in accordance with some embodiments of the present invention, an entry which is correlated with an incoming request which is associated with a particular priority level request or parameter may be positioned above any entry which is correlated with an incoming request which is associated with priority levels that are considered "lower", and below any entry which is correlated with an incoming request which is associated with priority levels that are considered "equal or higher". It should be noted this description relates to only one exemplary embodiment of the present invention.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A computer-implemented method for servicing a data service request received at a server in communication with a buffer, comprising:
    determining if the server includes sufficient resources to immediately service the data service request, wherein:
        the server includes insufficient resources to immediately service the data service request when a plurality of pending data service requests for the server are in a queue in the buffer for servicing by the server,
        each pending data service request includes a respective priority level of a plurality of priority levels, and
        each pending data service request includes a position in the queue based on each respective priority level;
    assigning a first priority level for the data service request if the server includes insufficient resources to immediately service the data service request, wherein assigning the first priority level for the data service request comprises:
        comparing, by the server, a plurality of parameters of the data service request against a lookup table; and
        assigning, by the server, the first priority level based on a plurality of priority values stored in the lookup table and associated with the plurality of request parameters;
    wherein at least one of the request parameters of the received request is correlated with a particular time interval in which the data service request is received;
    if the server includes sufficient resources to immediately service the data service request, performing the data service request without storing the data service request in the buffer;
    if the server includes insufficient resources to immediately service the data service request:
        storing the data service request in the buffer;
        determining, for the data service request, a first position in the queue based on the first priority level compared to the priority level for each respective pending data service request in the queue;
        determining a first length of time that the data service request is in the queue; and
        if the first length of time that the data service request is in the queue is greater than a threshold length of time, repositioning the data service request in the queue to a higher position in the queue that is ahead of at least one other data service request that includes:
            a.) a higher priority level than the data service request, and
            b.) a second length of time in the queue that is less than the threshold length of time.

2. The method according to claim 1, wherein the lookup table further includes one or more priority values relating to one or more particular logical units, and
    wherein said assigning further comprises assigning the received data service request with a higher priority level based on the logical unit associated with the data service request.

3. The method according to claim 2, wherein the parameters of the received data service request associated with one or more particular logical units are primary parameters and are assigned with a priority level based on the logical unit associated with the data service request, regardless of any other service request parameters.

4. The method according to claim 1, wherein at least one of the parameters of the received request is associated with an application that generated the request.

5. The method according to claim 1, wherein at least one of the parameters of the received request is correlated with performance data associated with the performance of a client who issued the service request.

6. The method according to claim 1, wherein at least one of the parameters of the received request is correlated with performance data associated with the performance of a server that received the service request.

7. The method according to claim 1, wherein at least one of the parameters of the received request is correlated with a time value relating to the occurrence of one or more events associated with the service request.

8. The method according to claim 1, wherein at least one of the parameters of the received request is correlated with an interface through which the service request has been received.

9. The method according to claim 1, wherein said storing further comprises positioning the data service request within a specific segment of the buffer in accordance with the first priority level assigned to the data service request.

10. The method according to claim 1, further comprising immediately servicing the data request if the server includes sufficient resources to immediately service the data request, wherein the server includes sufficient resources to immediately service the data request when the queue is empty.

11. The method according to claim 1, further comprising servicing each data service request from the queue in accordance with each respective priority level.

12. The method according to claim 1, wherein the first position is a higher position in the queue than a second position for a first different data service request.

13. The method according to claim 12, wherein the first position is a lower position in the queue than a third position for a second different data service request.

14. The method according to claim 1, wherein the data service request is stored in the first position in the queue within the buffer, the method further comprising:
    receiving a new data service request;
    determining that the server includes insufficient resources to immediately service the new data service request;
    determining a second priority level for the new data service request;
    storing the new data service request in the buffer; and
    determining, for the new data service request, a second position in the queue based on the second priority level compared to the first priority level.

15. The method according to claim 14, wherein the second position for the new data service request is a higher position in the queue than the first position for the data service request.

16. The method according to claim 15, wherein the second position is a lower position in the queue than a third position for a previously queued data service request.

17. The method according to claim 1, further comprising:
    determining that the data service request has remained in the first position for greater than a predetermined amount of time; and
    changing the data service request from the first position to a second position in response to determining that the data service request has remained in the first position for greater than the predetermined amount of time.

18. A system for servicing a data service request, comprising:
    a buffer configured for including a queue;
    a processor in communication with the buffer; and
    a memory in communication with the processor, the memory comprising computer code that, when executed by the processor, cause the processor to perform a method comprising:
        determining if the system includes sufficient resources to immediately service the data service request, wherein:
            the system includes insufficient resources to immediately service the data service request when a plurality of pending data service requests for the system are in the queue for servicing by the system,
            each pending data service request includes a respective priority level of a plurality of priority levels, and
            each pending data service request includes a position in the queue based on each respective priority level;
        assigning a first priority level for the data service request if the system includes insufficient resources to immediately service the data service request, wherein assigning the first priority level for the data service request comprises:
            comparing, by the processor, a plurality of parameters of the data service request against a lookup table, and
        assigning, by the processor, the first priority level based on a plurality of priority values stored in the lookup table and associated with the plurality of request parameters,
            wherein at least one of the request parameters of the received request is correlated with a particular time interval in which the data service request is received,
        if the server includes sufficient resources to immediately service the data service request, performing the data service request without storing the data service request in the buffer;
        if the server includes insufficient resources to immediately service the data service request:
            storing the data service request in the buffer; determining, for the data service request, a first position in the queue based on the first priority level compared to the priority level for each respective pending data service request in the queue;
            determining a first length of time that the data service request is in the queue; and
            if the first length of time that the data service request is in the queue is greater than a threshold length of time, repositioning the data service request in the queue to a higher position in the queue that is ahead of at least one other data service request that includes:
                a.) a higher priority level than the data service request, and
                b.) a second length of time in the queue that is less than the threshold length of time.

19. The system according to claim 18, wherein the computer code further causes the processor to perform a method comprising servicing each data service request from the queue in accordance with each respective priority level.

20. The system according to claim 18, wherein the first position is a higher position in the queue than a second position for a first different data service request.

21. The system according to claim 20, wherein the first position is a lower position in the queue than a third position for a second different data service request.

22. The system according to claim 18, wherein the data service request is stored in the first position in the queue within the buffer, the computer code causing the processor to perform the method further comprising:
    receiving a new data service request;
    determining that the server includes insufficient resources to immediately service the new data service request;
    determining a second priority level for the new data service request;
    storing the new data service request in the buffer; and
    determining, for the new data service request, a second position in the queue based on the second priority level compared to the first priority level.

23. The system according to claim 22, wherein the second position for the new data service request is a higher position in the queue than the first position for the data service request.

24. The system according to claim 23, wherein the second position is a lower position in the queue than a third position for a previously queued data service request.

25. A computer-readable memory comprising:
    computer code for determining if a server includes sufficient resources to immediately service the data service request, wherein:
        the server includes insufficient resources to immediately service the data service request when a plurality of pending data service requests for the system are in the queue for servicing by the server, each pending data service request includes a respective priority level of a plurality of priority levels, and each pending data service request includes a position in the queue based on each respective priority level;

computer code for assigning a first priority level for the data service request if the server includes insufficient resources to immediately service the data service request, wherein assigning the first priority level for the data service request comprises:

comparing a plurality of parameters of the data service request against a lookup table, and assigning the first priority level based on a plurality of priority values stored in the lookup table and associated with the plurality of request parameters, wherein at least one of the parameters of the received request is correlated with a client who issued the data service request, wherein at least one of the parameters of the received data service request is associated with a priority level request requested by the client, and wherein the first priority level request requested by the client is associated with a particular time interval in which the data service request is received;

if the server includes sufficient resources to immediately service the data service request, computer code for performing the data service request without storing the data service request in the buffer;

if the server includes insufficient resources to immediately service the data service request:

computer code for storing the data service request in a buffer;

computer code for determining, for the data service request, a first position in the queue based on the first priority level compared to the priority level for each respective pending data service request in the queue;

computer code for determining a first length of time that the data service request is in the queue; and if the first length of time that the data service request is in the queue is greater than a threshold length of time, computer code for repositioning the data service request in the queue to a higher position in the queue that is ahead of at least one other data service request that includes:

a.) a higher priority level that the data service request, and b.) a second length of time in the queue that is less than the threshold length of time.

26. The computer-readable memory according to claim 25, further comprising computer code for servicing each data service request from the queue in accordance with each respective priority level.

27. The computer-readable memory according to claim 25, wherein the first position is a higher position in the queue than a second position for a first different data service request.

28. The computer-readable memory according to claim 27, wherein the first position is a lower position in the queue than a third position for a second different data service request.

29. The computer-readable memory according to claim 25, wherein the data service request is stored in the first position in the queue within the buffer, the computer-readable memory further comprising:

computer code for receiving a new data service request;

computer code for determining that the server includes insufficient resources to immediately service the new data service request;

computer code for determining a second priority level for the new data service request;

computer code for storing the new data service request in the buffer; and computer code for determining, for the new data service request, a second position in the queue based on the second priority level compared to the first priority level.

30. The computer-readable memory according to claim 29, wherein the second position for the new data service request is a higher position in the queue than the first position for the data service request.

31. The computer-readable memory according to claim 30, wherein the second position is a lower position in the queue than a third position for a previously queued data service request.

* * * * *